(12) United States Patent
Okada

(10) Patent No.: US 7,024,495 B2
(45) Date of Patent: Apr. 4, 2006

(54) PROGRAMMABLE CONTROLLER

(75) Inventor: Kazunori Okada, Kyoto (JP)

(73) Assignee: OMRON Corporation, Kyoto (JP)

( * ) Notice: Subject to any disclaimer, the term of this patent is extended or adjusted under 35 U.S.C. 154(b) by 139 days.

(21) Appl. No.: 10/109,541

(22) Filed: Mar. 27, 2002

(65) Prior Publication Data

US 2002/0161944 A1 Oct. 31, 2002

(30) Foreign Application Priority Data

Mar. 30, 2001 (JP) ............................. 2001-100232

(51) Int. Cl.
G06F 13/28 (2006.01)
G06F 13/12 (2006.01)

(52) U.S. Cl. .............................. 710/22; 710/7; 710/14; 710/16; 710/20; 710/38; 710/64; 710/306

(58) Field of Classification Search .................. 710/16, 710/62, 72, 104, 1, 2, 5–7, 14, 20–22, 28, 710/29, 33, 35, 36, 38, 64, 305, 306, 308, 710/311
See application file for complete search history.

(56) References Cited

U.S. PATENT DOCUMENTS

| 4,137,565 | A | * | 1/1979 | Mager et al. .................. 710/22 |
| 5,371,860 | A |  | 12/1994 | Mura et al. |
| 5,678,021 | A | * | 10/1997 | Pawate et al. .............. 711/104 |
| 5,687,325 | A | * | 11/1997 | Chang ........................ 710/104 |
| 5,835,734 | A | * | 11/1998 | Alkalaj et al. ............... 710/104 |
| 5,923,892 | A | * | 7/1999 | Levy ........................... 712/31 |
| 6,311,296 | B1 | * | 10/2001 | Congdon ..................... 714/56 |
| 2003/0050087 | A1 | * | 3/2003 | Kwon ........................ 455/550 |

FOREIGN PATENT DOCUMENTS

| JP | 56-153407 |   | 11/1981 |
| JP | 3-080304  |   | 4/1991  |
| JP | 8-6616    |   | 1/1996  |
| JP | 10-149341 | * | 6/1998  |
| JP | 11-249714 |   | 9/1999  |

OTHER PUBLICATIONS

People's Republic of China Patent Application No. 021237034, *Programming Controller*, Second Office Action mailed Dec. 10, 2004.

* cited by examiner

Primary Examiner—Tanh Q. Nguyen
(74) Attorney, Agent, or Firm—Beyer Weaver & Thomas LLP

(57) ABSTRACT

A programmable controller has a multi-purpose processor such as an MPU and an application specific control device such as an ASIC (application specific integrated circuit). When the MPU requests the ASIC to execute a user program and the ASIC is activated, the MPU executes an event process while the ASIC executes the requested user program. When the MPU requests the ASIC to execute a DMA transfer process in an input/output refresh process and the ASIC is activated, the MPU executes an event process while the ASIC executes the requested DMA transfer process.

5 Claims, 3 Drawing Sheets

PROGRAMMABLE CONTROLLER

BACKGROUND OF THE INVENTION

This invention relates to a programmable controller, and more particularly to a programmable controller adapted to concurrently carry out a peripheral service process (event processing) for a peripheral component such as a host computer and a communication unit while carrying out the execution of a user program or an input/output refresh process such that the cycle time of the CPU unit of the programmable controller can be reduced and its response is improved. The invention also relates to a method of controlling such a programmable controller.

In general, a programmable controller is structured as an assembly of an I/O unit connected to sensors, switches and actuators, a CPU unit for executing a preset user program and a communication unit for communicating with a host system through a network. In the case of a middle-sized or small-sized programmable controller, the CPU unit is provided with a micro-processing unit (MPU) through which input signals, say, from a sensor, are received from the I/O unit for use in logical formulas in the user program. The result of such an operation is transmitted as an output signal to the I/O unit and an actuator or the like is thereby driven to control a production device. The I/O data are stored in the I/O memory of the CPU unit.

FIG. 3 shows an outline of such processing by the CPU unit of a programmable controller of this type. As the power source is switched on, the programmable controller undergoes a power-on (initialization) routine (Step 301) including initialization of memory devices and recognition of each assembled unit. Next, common processes are carried out whereby battery abnormality is checked in order to ascertain the condition of the current supply (Step 302). Next, operational processes are carried out such as the execution of a user program (Step 303). For the first cycle of the program, the input signals stored when power was previously shut off may be retrieved in Step 301 such that the process may be started as a continuation from the time of previous power-off. Alternatively, operations may be carried out according to the initialization data of Step 301. Next, an I/O refresh process is carried out (Step 304) whereby input data from an external control device such as a switch may be written in the I/O memory and I/O data updated on the basis of the result of an operation may be outputted to the object of control. Next, a peripheral service process (event process) is carried out (Step 305) such as exchange of data with a tool connected through a network or the communication unit. Thereafter, Steps 302–305 are repeated as a cyclic process. The time required from Step 302 to Step 305 is generally referred to as the cycle time of the CPU unit.

Programmable controllers of this type are also used as a programmable controller system structured as shown in FIG. 4 with a host system 401 which may comprise a personal computer, a plurality of child-programmable computers (child PLC) 403, 404, 405, . . . and a parent-programmable computer (parent PLC) 402 in between such that many kinds of control can be carried out. In such a system, the parent PLC collects data from the child PLCs and transmits the collected data to the host system 401 such that the host system 401 can monitor the system as a whole.

If a programmable controller of the kind having one MPU is used as the parent PLC when a system as shown in FIG. 4 is assembled, it will carry out processes as shown in FIG. 3, that is, Steps 302–305 per cycle. Since it cannot start the peripheral service process until Steps 302–304 are completed, even if the host system or the CPU unit through the communication unit wishes to carry out a peripheral service process (event process) with high priority, the system has to wait for the cycle time for the peripheral service process. In other words, a quick event response cannot be achieved.

In order to reduce the cycle time, it has been known to mount an application specific integrated circuit (ASIC) as a dedicated hardware circuit to the CPU unit of the programmable controller in addition to an MPU (an equivalent of a multi-purpose processor). An application specific control device means a hardware circuit with the function of carrying out a part of programs in a user program. Since the execution is by a hardware circuit, it works much faster than a multi-purpose processor operating on software. When a complicated application command is executed, however, it becomes necessary to develop and design a dedicated hardware circuit for the purpose and it is difficult to realize it on an ASIC. Accordingly, it is now a common practice to produce an ASIC by developing and designing hardware circuits for executing some limited commands referred to as bit operations and basic commands, that is, to design an ASIC for executing commands suitable for handling by hardware.

On the other hand, a multi-purpose processor such as an MPU, carrying out software operations, can handle not only commands requiring complicated operations referred to as application commands but also bit operations and basic commands which are simple operations. The speed of its software operation, however, is not as great as the operation speed of a hardware circuit.

The time required for the execution of a user program can be reduced with a programmable controller having devices of both kinds mounted thereon. This is because those in the user program that can be handled by an application specific control device are handled by an application specific control device, not by a multi-purpose processor. In practice, each command in a user program is examined and it is decided whether it can be processed by an application specific control device or not. If it is decided that it can, it is processed by an application specific control device. If it is decided that it cannot, it is processed by a multi-purpose processor. Although the cycle time can be reduced in this manner, execution of the user program, the I/O refresh process and the event process are sequentially performed in a series of cyclic operations. Thus, unless the execution of the user program and the I/O refresh process is completed, the event process cannot be initiated. Even if it is desired to carry out a peripheral service process with high priority, it cannot be done and a quick event response is not available.

SUMMARY OF THE INVENTION

It is therefore an object of this invention to improve the response time of a programmable controller having both a multi-purpose processor and an application specific control device mounted thereon by allowing an event process to be executed concurrently while a user program may be being executed.

In view of the object described above, a programmable controller embodying this invention may be characterized as having a multi-purpose processor and an application specific control device so designed that the multi-purpose processor, when the multipurpose processor requests the application specific control device to execute a user program and activates the application specific control device, executes an event process while the application specific control device executes the requested user program, and/or that the multipurpose processor, when it requests the application specific control device to execute a DMA transfer process in an input/output refresh process and activates the application specific control device, executes an event process while the application specific control device executes the requested DMA transfer process.

This invention also relates to methods of controlling a programmable controller having both a multi-purpose processor and an application specific control device mounted thereon, characterized as designing the multi-purpose processor and the application specific control device such that the multi-purpose processor, when the multipurpose processor requests the application specific control device to execute a user program and activates the application specific control device, executes an event process while the application specific control device executes the requested user program, and/or that the multi-purpose processor, when it requests the application specific control device to execute a DMA transfer process in an input/output refresh process and activates the application specific control device, executes an event process while the application specific control device executes the requested DMA transfer process.

In the above, the multi-purpose processor may be an MPU mounted to the programmable controller and the application specific control device may be a dedicated ASIC mounted to the programmable controller for the execution of a user program.

The "event process" includes peripheral service processes for peripheral components and processes for peripheral components such as a host system and a communication unit. The "user program" may include commands requiring a long time period for their execution. If such a command is consigned to the application specific control device, the multi-purpose processor gains free time and can secure sufficient time for the execution of event processing.

DETAILED DESCRIPTION OF THE INVENTION

Figure 1:
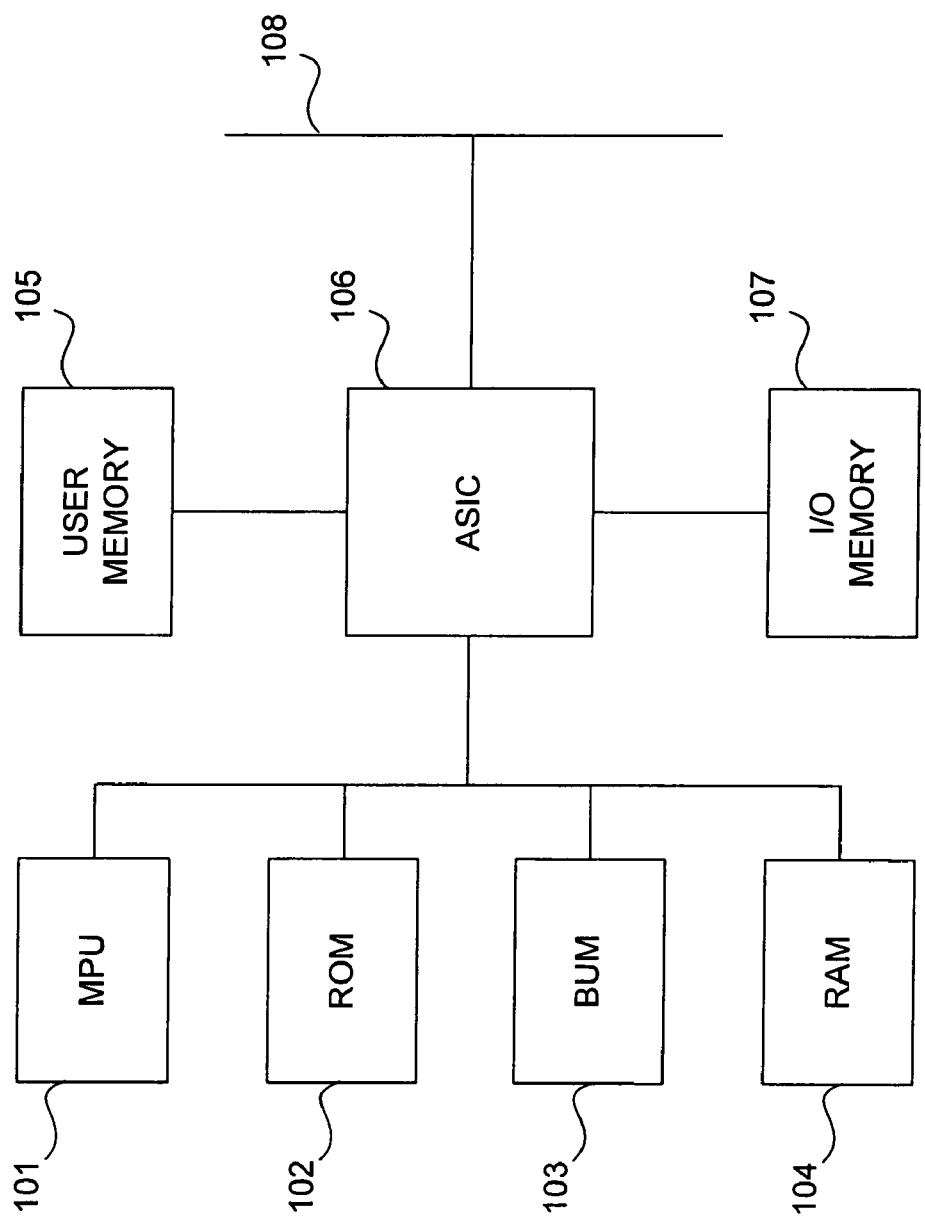
FIG. 1 is a block diagram of the CPU unit for a programmable controller.

The invention is described next by way of an example. FIG. 1 shows the CPU unit of a programmable controller embodying this invention, as comprising a micro-processing unit (MPU as a multi-purpose processor) 101, a read only memory (ROM) 102, a random access memory (RAM) 104, a user memory 105, an application specific integrated circuit (ASIC as an application specific control device) 106, an I/O memory 107 and an I/O bus 108.

The MPU 101 is a microprocessor unit for controlling the entire operations of the CPU unit, being connected to the ROM 102, the RAM 104 and the ASIC 106 through an internal bus, and is adapted, similar to a conventional MPU, to execute a user program, the I/O refresh process and an event process cyclically.

The ROM 102 is a memory for storing the system firmware of this CPU unit. It also stores the programs related to the operations of the I/O refresh and event processes, as well as the user program commands executed by the MPU 101. Numeral 103 indicates a back-up user memory. The RAM 104 is used as a system work by the CPU unit and may be used to store data which may be used temporarily when the aforementioned system firmware operates, such as intermediate data in an operation. The user memory 105 is for storing the user program which the user creates by using a tool and a PLC language such as the ladder language. The ASIC 106 is connected to the MPU 101, the ROM 102 and the RAM 103 through an internal bus and directly to the user memory 105 and the I/O memory 107. It is also connected to the I/O bus 108 and is adapted to carry out bus communications with the I/O unit and the communication unit. It is a dedicated control device, reading out commands from the user program stored in the user memory 105 and executing processes such as judging whether or not the command which has been read out can be executed by the ASIC, executing commands which can be executed by the ASIC, the DMA transfer in the I/O refresh process, the bus interface process for the I/O bus 108, and the regulation process for the I/O memory. Correlated operations between the ASIC 106 and the MPU 101 will be described below. The I/O memory 107 has the function of storing the I/O data required for the control of this programmable controller, that is, the input data used when the user program stored in the user memory 105 is executed and the output data representing the results of operations. The data stored in the I/O memory 107 become necessary when the ASIC 106 regulates the memory access more than once with the I/O unit and the communication unit (not shown) connected through the MPU 101, the ASIC 106 and the I/O bus 108.

According to the present embodiment, a system setting area is present within the I/O memory 107 for specifying an operation mode of this programmable controller. The operation modes that are stored in this area of the I/O memory include the following:
  (1) the normal mode, and
  (2) the parallel execution mode.

The normal mode is the same as the conventional mode wherein the execution of the user program (to be described below). The parallel execution of the I/O refresh process and the event process are not carried out in this mode. It is the parallel execution mode that characterizes the present invention.

In this mode, firstly, the MPU 101 executes the event process, which used to be carried out as one of a series of cyclic processes, while the ASIC 106 executes the user program. In other words, it is not that the event process is carried out within the series of cyclic processes and after the completion of the I/O refresh process, but that the event process is executed by the MPU concurrently while the ASIC is executing the user program. Thus, the event process is taken out of the series of cyclic processes, and the user program and the event process are executed concurrently in parallel. Secondly, the conventional execution of an event process is carried out by the MPU 101 while the ASIC 106 carries out the DMA transfer within the I/O refresh process. In other words, it is not that the event process is executed after the completion of the I/O refresh process which is a part of the series of cyclic processes but that it is executed by the MPU 101 while the ASIC is occupied with the DMA transfer process. Thus, the execution of the user program and the parallel execution of the I/O refresh process and the event process are sequentially repeated. In what follows, a programmable controller having both of these characteristics is explained.

Figure 2:
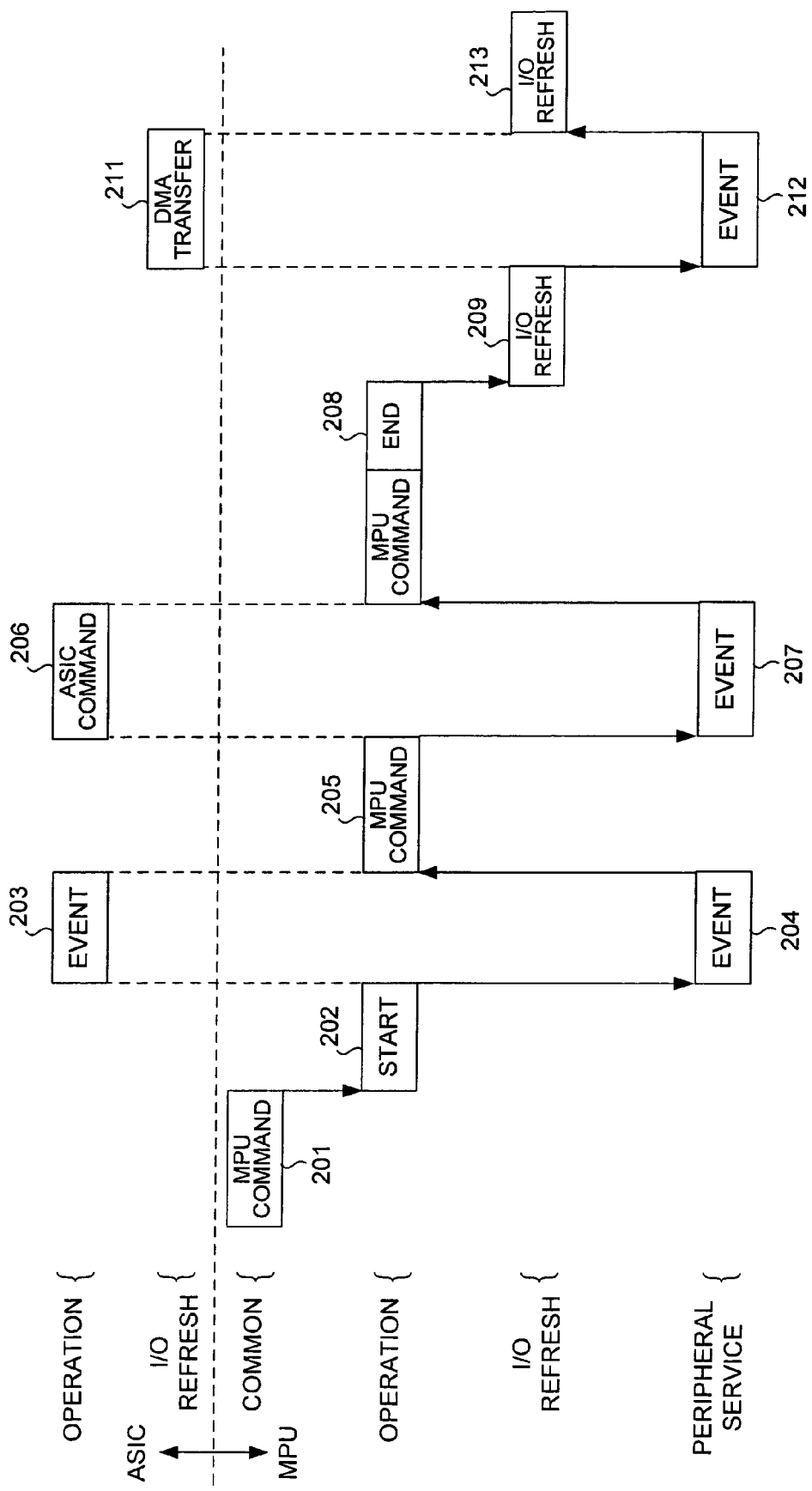
FIG. 2 is a time chart for showing the internal processing of the MPU shown in FIG. 1 when the parallel execution mode of operations has been selected.
Figure 4:
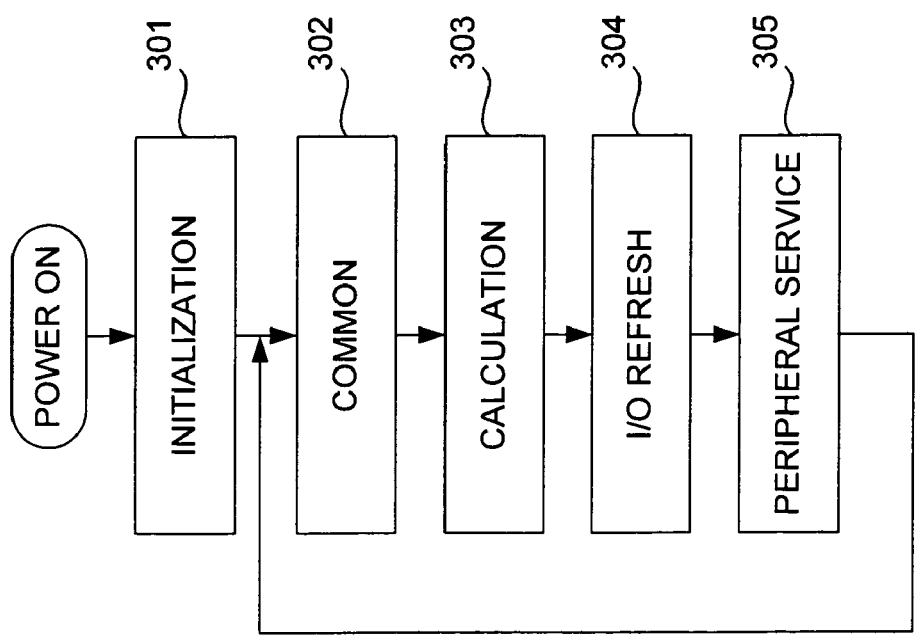
FIG. 4 is a block diagram of a prior art programmable controller.
Figure 3:
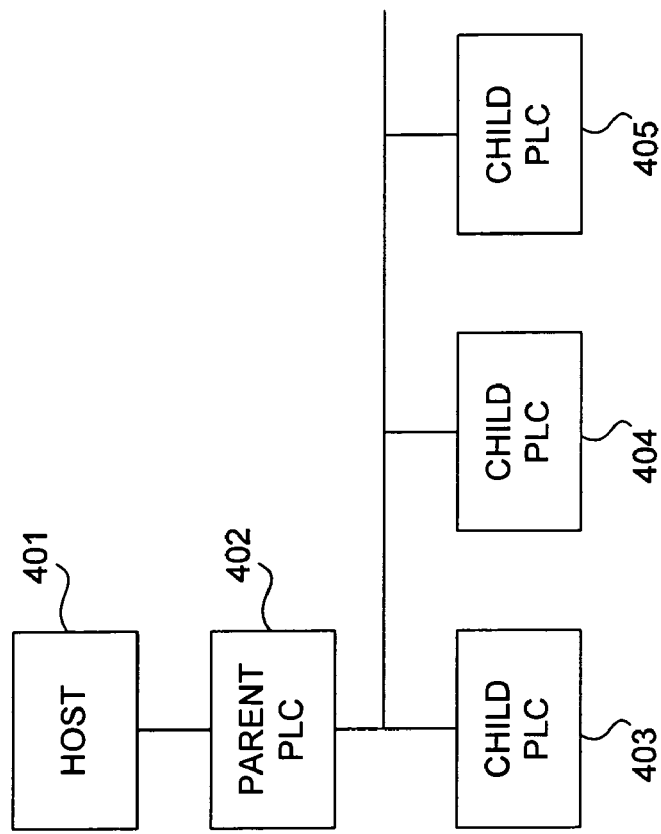
FIG. 3 is a flowchart of the basic cyclic processes for the CPU unit of a prior art programmable controller.

When the programmable controller is started, the MPU 101 reads in the contents specified by the operation mode stored in the system setting area of the I/O memory 107 and selects its internal processing according to the received operation mode. FIG. 2 shows the internal processing by the MPU 101 shown in FIG. 1 when the parallel execution mode has been selected.

After a common process 201 has been executed and during the start process 202 in the prosecution of a command in the user program, the MPU 101 requests the execution of a command in the user program, activating an ASIC command 203. Upon receiving this request, the ASIC 106 reads the user program stored in the user memory 105, retrieving the contents of its commands sequentially and determining for each command whether it can be executed by the ASIC 106. Since the ASIC 106 is developed and designed so as to be able to execute many commands, many of the commands will be adjudged executable and are executed sequentially by the ASIC 106, as shown at 203 in FIG. 2. The request by the MPU 101 may be made, for example, by writing such a request in a register for activating the ASIC 106. After making a request to the ASIC 106, the MPU 101 becomes free to carry out other processes as long as the ASIC 106 is executing the use program and makes use of this freedom to execute an event process 204 such as a peripheral event process.

To explain the event process 204 more in detail, the MPU 101 keeps checking during this period whether or not there is a request for an event execution from the communication unit (not shown) connected through the I/O bus 108. It keeps waiting as long as there is no such request. If there is a request, the MPU 101 undertakes its execution. Examples of event processing include reading out a portion of the content of the I/O memory 107 to transmit it to the communication unit or a tool, receiving I/O data from the communication unit by the CPU unit to write them into the I/O memory, and rewriting data in the I/O memory from a tool. During a period of event processing, a plurality of request for event processing may be received.

The access to the I/O memory at the time of event processing is regulated by the ASIC 106. This regulation process and the execution of the ASIC command 203 are carried out in series. In other words, after determining whether a command is executable by the ASIC and executing it if it is executable thereby, the ASIC 106 carries out the regulation process, if necessary. After the regulation process has been carried out, the ASIC 106 reads out the next command. This mode of operations in series, however, is not intended to limit the scope of the invention. It may be so arranged that the regulation process and the execution of the ASIC command are carried out in parallel. In either case, the execution of an event process 204 by the MPU 101 and that of the user program (or the ASIC command 203) by the ASIC 106 are carried out concurrently.

If the ASIC 106 encounters a command which is found to be not executable by ASIC as it keeps reading out commands from the user program, the execution of the ASIC command 203 is stopped, and the ASIC 106 outputs a signal to this effect to the register and requests the MPU 101 to execute it. Explained more in detail, this is done by outputting an interrupt signal from the ASIC 106 to the MPU 101, and the MPU 101, upon receiving the interrupt, either stops the execution of the event process 204 or continues until a convenient point and then starts the execution of the command of the user program to be performed by the MPU 101. This is shown by numeral 205 in FIG. 2.

When the processing of one command (indicated by numeral 205 as "MPU command") is completed, the MPU 101 makes another request to the ASIC 106. Upon receiving this request, the ASIC 106 reads out the next command from the user memory 105 and determines whether or not this command is executable by the ASIC. If it is an executable command, it is executed by the ASIC 106 as the ASIC command 206. The ASIC command 206 is continued until the ASIC 106 encounters a command which is determined not to be executable by the ASIC and should be executed by the MPU 101. Until then, the MPU 101 utilizes this time interval by executing an event process 207 such as peripheral service processing. In this instance, too, the execution of the ASIC command 206 and that of the event process 207 by the MPU 101 are carried out concurrently in parallel. Such parallel executions are repeated until all of the commands of the user program are carried out.

When the execution of the user program is completed, the MPU carries out its end process 208 and commences the execution of an I/O refresh process 209. This is a process for updating the I/O memory 107 by receiving data from an I/O unit (not shown) connected to the I/O bus to write them in the input data area of the I/O memory 107 and transmitting the result of the execution of the user program recorded in the I/O memory 107 to the I/O unit as output data. In short, an exchange of data takes place between the I/O memory 107 and a common memory on the I/O unit. Such an exchange may also be made with a high-performance unit such as an analog operational unit.

If there are too many data to be exchanged in this I/O refresh process 209, the MPU 101 activates the DMA transfer 211 which is one of the functions of the ASIC 106. Explained more in detail, the DMA transfer 211 is a method which may be employed, when data in the I/O memory to be refreshed are in mutually contiguous areas, for transferring such data together onto mutually contiguous areas in a common area of an external unit through the I/O bus 108. The DMA transfer is also used when data on mutually contiguous areas on the common memory of an external unit are transferred onto mutually contiguous areas on the I/O memory 107. This is used in particular when analog data are exchanged with a high-performance unit.

When an I/O refresh process is to be carried out, the MPU 101 determines whether or not the data to be refreshed are suitable for the DMA transfer. If the data are to be refreshed individually, the DMA transfer is not suitable and the I/O refresh process is carried by the MPU 101 itself, as indicated by numeral 209. If it is a summary data refresh with an analog processing unit, for example, the ASIC 106 is requested to carry out the process, as indicated by numeral 211, while the MPU 101 occupies itself with the execution of an event process 212 such as a peripheral service process. Alternatively, the DMA transfer may be externally specified such that the MPU 101 receives this specification to make a determination.

Thus, while the DMA transfer is taking place, the execution of the DMA transfer 211 by the ASIC 106 and the event processing 212 by the MPU 101 are carried out in parallel. When the DMA transfer 211 by the ASIC 106 is completed, an interrupt is outputted from the ASIC 106 to the MPU 101, and the MPU 101 responds by stopping the execution of the event processes or finishes one event process and then switches to the I/O refresh process 213.

If data which are suitable for the DMA transfer are encountered during the execution of the I/O refresh process, the MPU 101 transmits a request to the ASIC 106, and the execution of the DMA transfer as an ASIC command and the execution of an event process by the MPU 101 are carried out concurrently. Thereafter, the I/O refresh process and the parallel execution of the DMA transfer and the event process are repeated as long as necessary.

When the I/O refresh process is completely over, the peripheral service processes (event processes), which used to be done conventionally, are not carried out, but the controller returns to the common processing. In other words, the series of cyclic processes by this programmable controller are different, depending on the mode of operations. Explained more in detail, the common process, the execution of the user program, the I/O refresh and event processing are carried out as a series of cyclic processes if the controller is operated in the normal mode. In the parallel execution mode, on the other hand, the common process, the execution of the user program and the I/O refresh are sequentially repeated as a series of cyclic processes, and the MPU 101 carries out an event process in parallel while the ASIC 106 is executing a command or carrying out the DMA transfer process.

Although it was explained above that the controller in this mode of operations does not return to the execution of the peripheral service but to the common process after the I/O refresh process is completed, the situation may be different, for example, if a memory card is used with the CPU unit of the programmable controller. Such a memory card employs a compact flash memory which may be used to store the history of executions by the CPU unit and data related to the history of abnormalities and errors. If it is attempted to retrieve such history data by an external tool, it usually takes considerably more time than the usual data exchange with the communication unit. If such a process is carried out as an event process (such as shown at 204, 207 and 212 in FIG. 2) by the parallel execution format as explained above, it may be stopped in the middle such that the tool fails to collect the desired data or the process cannot proceed appropriately because the processing time becomes too long. In view of such a possibility, it is preferred to carry out such event processing as an exception after the processing of the I/O refresh in the case of a time-consuming event process. According to an actual embodiment, the MPU 101 does not carry out such a time-consuming event process during the normal period for the event processing (such as 204, 207 and 212) when it receives the request for its execution but remembers that such a request for a time-consuming request has been made and carries out its execution only after the I/O refresh process is completed at the end of the cycle.

Although two modes of operations ((1) the normal mode and (2) the parallel execution mode) were mentioned above, additional modes may be incorporated within the scope of this invention such as:

(3) a third mode wherein not only are a series of cyclic processes carried out as in the normal mode but also the ASIC processes as shown at 203 and 206, the event processing as shown at 204 and 207 and the execution of the DMA transfer as shown at 211 and the event processing as shown at 212 are carried out; and (4) a fourth mode, which resembles the second or third mode, wherein an event processing as shown at 212 is carried out while the DMA transfer process as shown at 211 is taking place.

With these modes incorporated, the programmable controller can reduce the cycle time of its CPU unit because the MPU 101 carries out event processes while the ASIC 106 is in operation such that it utilizes its available time effectively.

Although the "series of cyclic processes" were explained above by way of an example consisting of a common process, the processing of a user program and the I/O refresh processing (plus peripheral service processing), this is not intended to limit the scope of the invention. Examples of cyclic processes also include: (a) a cycle of common process, input refresh processing, processing of user program and output refresh processing (plus peripheral service processing); and (b) a cycle of common process, I/O refresh processing, processing of user program (plus peripheral service processing). Programmable controllers of this invention programmed to carry out such cyclic processes can also take advantage of the parallel execution mode of operations, the MPU carrying out an event process while the user program is being executed as an ASIC process.

As a result, the present invention serves to improve the response characteristic of the programmable controller. It also goes without saying that the conventional way of operations remains available if the normal mode of operations is selected.

What is claimed is:

1. A programmable controller comprising:
    a multi-purpose processor; and
    an application specific control device;
    wherein said programmable controller serves to execute cyclically a series of processes including execution of a user program, an input/output refresh process and an event process; and
    wherein said multi-purpose processor determines, while carrying out said input-output refresh process, whether or not it is more appropriate to execute a DMA transfer process on data to be refreshed, makes a request to said application specific control device to carry out said input-output refresh process by said DMA transfer process if it is determined to be more appropriate, executes said event process concurrently while said application specific control device carries out said input-output refresh process by said DMA transfer process, and carries out said input-output refresh process without making said request to said application specific control device if it is determined not to be more appropriate, wherein it is more appropriate when data are not to be refreshed individually.

2. The programmable controller of claim 1 wherein said multi-purpose processor is a software processor and said application specific control device comprises a hardware circuit.

3. A method of controlling a programmable controller including a multi-purpose processor and an application specific control device, said method comprising the steps of:
    causing said programmable controller to execute cyclically a series of processes including execution of a user program, an I/O refresh process and an event process; and
    causing said multi-purpose processor to determine, while carrying out said input-output refresh process, whether or not it is more appropriate to execute a DMA transfer process on data to be refreshed, to make a request to said application specific control device to carry out said input-output refresh process by said DMA transfer process if it is determined to be more appropriate, to execute said event process concurrently while said application specific control device carries out said input-output refresh process by said DMA transfer process, and to carry out said input-output refresh process without making said request to said application specific control device if it is determined not to be more appropriate, wherein it is more appropriate when data are not to be individually.

4. The programmable controller of claim 1 wherein said multi-purpose processor serves to judge whether data to be refreshed are suitable for said DMA transfer process and requests said application specific control device to execute said DMA transfer process if said data are judged to be suitable for said DMA transfer process.

5. The programmable controller of claim 4 wherein said multi-purpose processor is a software processor and said application specific control device comprises a hardware circuit.

* * * * *